United States Patent
Dannoux et al.

(10) Patent No.: US 10,059,618 B2
(45) Date of Patent: Aug. 28, 2018

(54) REFORMING MANDREL GEOMETRY FOR FLATNESS CONTROL

(71) Applicant: CORNING INCORPORATED, Corning, NY (US)

(72) Inventors: Thierry Luc Alain Dannoux, Avon (FR); Mickaël Mabrut, Samoreau (FR); Ronan Tanguy, Grez sur Loing (FR)

(73) Assignee: CORNING INCORPORATED, Corning, NY (US)

( * ) Notice: Subject to any disclaimer, the term of this patent is extended or adjusted under 35 U.S.C. 154(b) by 179 days.

(21) Appl. No.: 15/006,615

(22) Filed: Jan. 26, 2016

(65) Prior Publication Data
US 2016/0221858 A1 Aug. 4, 2016

Related U.S. Application Data

(60) Provisional application No. 62/109,959, filed on Jan. 30, 2015.

(51) Int. Cl.
*C03B 7/084* (2006.01)
*C03B 15/14* (2006.01)
(Continued)

(52) U.S. Cl.
CPC .......... *C03B 23/045* (2013.01); *C03B 17/04* (2013.01); *C03B 23/0476* (2013.01);
(Continued)

(58) Field of Classification Search
CPC ......... C03B 7/084; C03B 7/086; C03B 15/14; C03B 17/025; C03B 17/04; C03B 23/04; C03B 23/076
See application file for complete search history.

(56) References Cited

U.S. PATENT DOCUMENTS

| 1,574,482 A | * | 2/1926 | Hirsch | C03B 17/04 |
| | | | | 65/184 |
| 1,583,464 A | * | 5/1926 | Houskeeper | C03B 23/049 |
| | | | | 264/DIG. 44 |

(Continued)

FOREIGN PATENT DOCUMENTS

| CN | 201074206 | 6/2008 |
| DE | 102011052069 | 1/2013 |

(Continued)

OTHER PUBLICATIONS

Pfaender, "Schott Guide to Glass," 2nd Edition, Chapman & Hall 1996.

(Continued)

*Primary Examiner* — Cynthia Szewczyk
(74) *Attorney, Agent, or Firm* — Dinsmore & Shohl LLP

(57) ABSTRACT

A reforming mandrel and a method of use reforming mandrel to reform glass are described. The reforming mandrel comprises an upstream portion, a downstream portion and an at least partially hollow interior. The upstream portion may have an intake inlet for fluid flow. The downstream portion may be axially spaced from the upstream portion. The downstream portion may have a flattened cross-section defined by flattened peripheral portions joined by curved peripheral portions. At least one curved peripheral portion may be made of porous material resistant to a temperature of at least 1000° C. The at least partially hollow interior may communicate with the intake inlet and the porous material.

20 Claims, 4 Drawing Sheets

(51) Int. Cl.
*C03B 17/04* (2006.01)
*C03B 23/04* (2006.01)
*C03B 23/07* (2006.01)
*C03B 23/045* (2006.01)
*C03B 40/04* (2006.01)
*C03B 23/047* (2006.01)
*C03B 23/09* (2006.01)

(52) U.S. Cl.
CPC .............. *C03B 23/09* (2013.01); *C03B 40/04* (2013.01); *Y02P 40/57* (2015.11)

(56) References Cited

U.S. PATENT DOCUMENTS

| | | | |
|---|---|---|---|
| 3,298,808 | A | 1/1967 | Macks |
| 6,820,444 | B1 * | 11/2004 | Birchard ................. C03B 23/06 65/109 |
| 2006/0141181 | A1 * | 6/2006 | Langsdorf ............... C03B 17/04 428/34.4 |
| 2012/0047951 | A1 | 3/2012 | Dannoux et al. |
| 2015/0225279 | A1 | 8/2015 | Bisson et al. |
| 2015/0232365 | A1 | 8/2015 | Bisson et al. |

FOREIGN PATENT DOCUMENTS

| | | |
|---|---|---|
| JP | 56026733 | 3/1981 |
| JP | 2007103168 | 4/2007 |

OTHER PUBLICATIONS

International Search Report of the International Searching Authority; PCT/US2016/015498; dated Apr. 25, 2016; 7 Pages; European Patent Office.

* cited by examiner

REFORMING MANDREL GEOMETRY FOR FLATNESS CONTROL

CROSS-REFERENCE TO RELATED APPLICATIONS

This application claims the benefit of priority under 35 U.S.C. § 119 of U.S. Provisional Application Ser. No. 62/109,959 filed on Jan. 30, 2015 the content of which is relied upon and incorporated herein by reference in its entirety.

FIELD

The disclosure relates to systems and methods for modifying the shape of a hollow structure, and more particularly to systems, such as an improved reforming mandrel geometry for flatness control, and methods for reforming a glass tubing to produce a three-dimensional formed glass cover for a handheld smart phone or other consumer electronic device. The glass cover optionally may be sleeve-shaped.

BACKGROUND

A glass panel is often used as a front cover for an electronic device, for example a cellular telephone or smart phone. Electronic device manufacturers now desire back covers of electronic devices that are also made of glass and that meet the same high dimensional accuracy and surface quality as the front covers. Although it is possible to make the front and back covers separately with the requisite dimensional accuracy and surface quality and then assemble each with a case, this adds extra steps to the manufacturing process and can result in loss of dimensional control.

Methods for forming glass tubing from molten glass are known. The most common ones are the Danner process, the Vello process, and the downdraw process. These processes are described in, for example, Heinz G. Pfaender, "Schott Guide to Glass," 2nd ed., Chapman & Hall, 1996. These processes are typically used to form glass tubing with a round cross-sectional shape. Extrusion can be used to form glass tubing with a non-round cross-sectional shape, e.g., a cross-sectional shape that could have flat sides. However, extrusion involves tool contact with the glass surface, which could diminish the surface quality of the glass. Non-round extrusions are harder to polish or otherwise post-treat to remove imperfections than are round extrusions, so the imperfections introduced by extrusion persist in the finished product. Current approaches have been limited by the quality of the products or by extremely low manufacturing speeds.

SUMMARY

The present disclosure relates, in various embodiments, generally to shaping or reforming mandrels for forming 3D glass articles. The reforming mandrel may comprise an upstream portion, a downstream portion, and an at least partially hollow interior. The upstream portion may have an intake inlet for fluid flow. The downstream portion may be axially spaced from the upstream portion. The downstream portion may have a flattened cross-section defined by flattened peripheral portions joined by curved peripheral portions. At least one curved peripheral portion may be made of porous material resistant to a temperature of at least 1000° C., for example. The at least partially hollow interior may communicate with the intake inlet and the porous material.

The present disclosure relates, in various embodiments, to a method for producing a glass sleeve with a flattened portion. The method may be useful in manufacturing a sleeve-like structure. The method is carried out by providing a substantially cylindrical glass tubing made of glass. The substantially cylindrical tubing may have a longitudinal axis and an inner curved surface enclosing a space. At least a portion of the substantially cylindrical tubing may be heated to a temperature within the softening range of the glass (temperature lower than softening point by about 10° C., for example). The softened substantially cylindrical tubing may be moved over to a reforming mandrel to reform the glass tubing into a glass sleeve with a flattened portion.

Additional features and advantages of the present disclosure will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF SEVERAL VIEWS OF THE DRAWINGS

The following is a description of the figures in the accompanying drawings. The figures are not necessarily to scale, and certain features and certain views of the figures may be shown exaggerated in scale or in schematic in the interest of clarity or conciseness.

Figure 1:
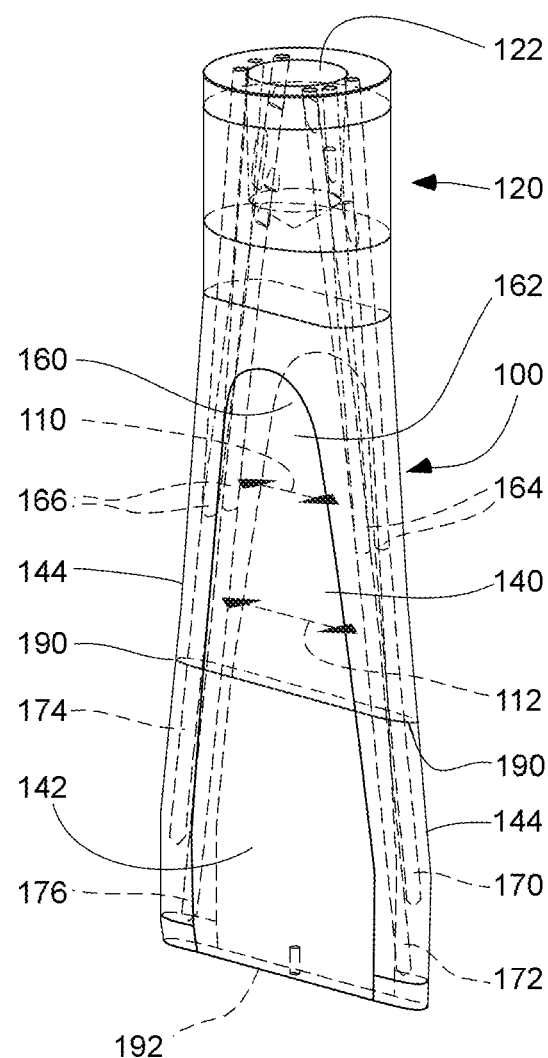
FIG. 1 is a perspective view of a reforming mandrel according to one embodiment.

The following reference characters are used in this specification:

| | |
|---|---|
| 100 | Reforming Mandrel |
| 102 | Nose |
| 110 | First width of flattened peripheral portion |
| 112 | Second width of flattened peripheral portion |
| 120 | Upstream portion |
| 122 | intake inlet |
| 136 | porous circumference |
| 140 | Downstream portion |
| 142 | flattened peripheral portions |
| 144 | curved peripheral portions |
| 160 | partially hollow interior |
| 162 | exterior |

-continued

| | |
|---|---|
| 164 | Passage |
| 166 | Passage |
| 170 | A first Passage |
| 172 | A second Passage |
| 174 | Passage |
| 176 | Passage |
| 178 | Vertical passage |
| 190 | Corner |
| 192 | Bottom |
| 314 | circumferential gap |
| 316 | glass tubing segment |
| 400 | Tubing |
| 510 | Round edge |
| 520 | A first corresponding exterior surface |
| 530 | A slope |
| 540 | second corresponding exterior surface |
| 610 | Longitudinal axis |
| 620 | Inner curved surface |
| 630 | Space enclosed by inner curved surface 620 |
| 640 | Plug |

The foregoing summary, as well as the following detailed description of certain inventive techniques, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the disclosure is provided as an enabling teaching of the disclosure in its currently known embodiments. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Reference will now be made in detail to the present preferred embodiment(s), examples of which are illustrated in the accompanying drawings. The use of a particular reference character in the respective views indicates the same or like parts. WO2014036236 filed on Aug. 29, 2013, US provisional application Ser. No. 61/694,913, filed Aug. 30, 2012, are incorporated herein by reference in their entirety.

As noted above, broadly, this disclosure teaches a reforming mandrel and a process to reform glass tubing by using such mandrel. The reforming mandrel may be made of a non-stick porous material such as graphite. The porosity may help in creating the bearing function (gas bearing with non inert gas or inert gas, such as nitrogen or argon for example) at the interface between the glass and the reforming tool. The process to reform glass tubing having a compact (for example circular or axisymmetric) cross-section, and thus into a non-axisymmetric (for example, flattened) glass enclosure presenting a high level of dimensional tolerance and optical quality. The method is applicable to any shaped glass, and is particularly useful for 3D-shaped parts, for example for tubings and sleeves. The methods described provide the following advantages: an optimized mandrel section support the glass in the transition zone, preventing local distortions. The reduced supporting area limits glass surface degradation in the transition zone. Additional air bearing feeding holes may improve the bearing efficiency on the edges and the transition zones.

As used herein, the term "sleeve" describes a three-dimensional, tubular glass article having a non-circular cross section and an aspect ratio greater than 1. The aspect ratio is the ratio of the largest and smallest diameters of the cross section of the tubing or sleeve. The aspect ratio has a minimum value of 1 by definition for a round or axisymmetric tube. The aspect ratio has a value larger than 1 for a flattened sleeve. Optionally in any embodiment, aspect ratios from about 1.5 to about 50, optionally from about 3 to about 39, optionally from about 5 to about 25, optionally from about 5 to about 15, optionally from about 7 to about 11, optionally from about 18 to about 28, are contemplated.

While most of the embodiments herein are used particularly in application to sleeve glass enclosures, it is contemplated that the same method could be applied more widely, for example with an additional step of cutting the tubes in half or severing optically flat portions to provide for a 3D shaped cover glass, touch screen, or other part.

As shown in FIG. 1, the reforming mandrel 100 may be used for non-contact shaping of an initial tubing made of a glass material into a profile tubing. The glass material may typically be glass, for example. The glass material may also be glass-ceramics. For example, glass-ceramics that can avoid nucleation or crystallization under the shaping conditions may generally be suitable. A possible example of glass-ceramics is transparent beta spodumene, available as KERALITE from Eurokera. The choice of glass may be based on the desired properties of the profiled tubing or sleeves to be made from the profiled tubing. The reforming mandrel 100 may be inserted inside tubing. For shaping of the tubing, the reforming mandrel 100 may generate a gas bearing that exerts forming a pressure on the tubing and maintains reduced contact force or spacing between the reforming mandrel 100 and the tubing. The gas barrier may allow the surface quality of the tubing to be preserved through the shaping process with the reforming mandrel 100. The gas barrier may prevent imperfections such as streaking from developing on the inner surface of the tubing during the shaping/reshaping process.

The reforming mandrel 100 may comprise an upstream portion 120, a downstream portion 140, and an at least partially hollow interior 160. The upstream portion 120 may have an intake inlet 122 for fluid flow. The downstream portion 140 may be axially spaced from the upstream portion 120. The upstream portion 120 may act only at the start of the reforming process.

The downstream portion 140 may have a flattened cross-section defined by flattened peripheral portions 142 joined by curved peripheral portions 144. Optionally in any embodiment, the reforming mandrel 100 may include two curved peripheral portions 144 separated by the flattened peripheral portions 142. The two curved peripheral portions 144 may be symmetrically or unsymmetrically placed on both sides of the reforming tool 100. The curved peripheral portions 144 may be fed with an inert gas, such as nitrogen or argon, in order to insure the bearing functions. The flattened peripheral portions 142 optionally may be designed so that no contact is made between the reformed sleeve glass and the reforming mandrel 100 during processing. At least one curved peripheral portion 144 may be made of porous material resistant to a temperature of at least 1000° C. Optionally in any embodiment, the porous material may be resistant to a temperature of at least 1200° C., for example.

The at least partially hollow interior 160 may communicate with the intake inlet 122 and the porous material. Optionally in any embodiment, the porous material may comprise carbon, zeolite, or molecular sieves, for example. The carbon may further comprise graphite. The graphite may be amorphous graphite, for example. The porous material may be non-stick porous material. The porosity may help in creating the bearing function at the interface between the glass and the reforming tool 100.

Optionally in any embodiment, the intake inlet 122 may be configured to allow gas to enter into the at least partially hollow interior 160, for example. The porous materials may be configured to allow gas to permeate to an exterior 162 of the reforming mandrel 100. Optionally in any embodiment, two flattened peripheral portions may be separated by a first width 110. Optionally in any embodiment, the at least one curved peripheral portion may have a second width 112. Optionally in any embodiment, the second width 112 may be greater than the first width 110.

Optionally in any embodiment, the at least one curved peripheral portion 144 may comprise at least one passage, such as, 164, 166, for example. The at least one curved peripheral portion 144 may comprise at least one major passage, a first passage 170, a second passage 172, 174, and 176. The passages 170, 172, 174 and 176 may go along the edges at a constant distance, such as 2 mm, from the graphite exterior surface. The passage 164 or 166 may stop at mid height relative to a bottom 192. The at least one passage, such as 164, 166, 170, 172, 174, or 176 may communicate with the at least partially hollow interior 160. The passages such as 164, 166, 170, 172, 174, or 176 may be blind in their bottom extremity. Optionally in any embodiment, there may be a corner 190 between each flattened peripheral portion 142 and each curved peripheral portion 144. Optionally in any embodiment, at least the first passage 170 may be provided adjacent to each corner 190.

Optionally in any embodiment, the gas may be at a gas pressure within the least partially hollow interior 160 of the reforming mandrel 100. Optionally in any embodiment, the gas pressure may be higher adjacent to each corner such as 190 than it is away from each corner such as 190. In one aspect, the internal pressure may be from 0.5 bar to 5 bars depending on the mandrel geometry, size or viscosity, for example. The exit pressure may be atmosphere pressure, for example. The passages 172 and 176 may terminate closer to the bottom 192 than the passages 170 and 174 respectively as shown in FIG. 1. In one aspect, the distribution network including passages 170, 172, 174, 176, 164 and 166 of the partially hollow interior 160, may have internal pressure of about 2 bars, for example.

Figure 2:
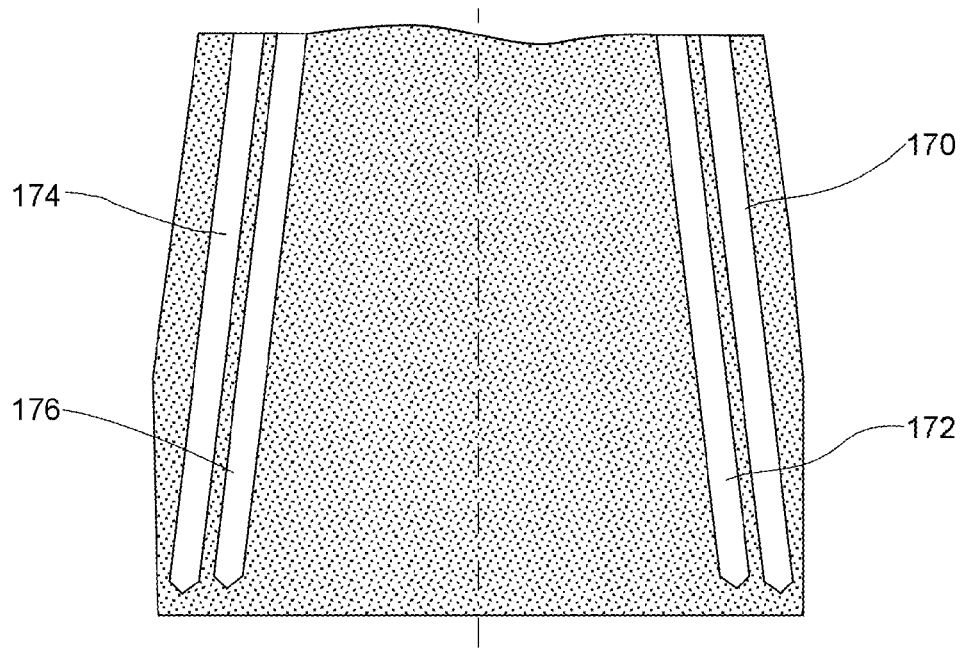
FIG. 2 is an enlarged view of passages of a reforming mandrel according to another embodiment.

As shown in FIG. 2, in another embodiment, the parallel passages 170 and 172 may be straight and terminate at the similar height relative to the bottom 192. Alternatively, the passages 170 and 172 may not parallel or straight and may not terminate at the relatively same height. Similarly, the parallel passages 174 and 176 may be straight and terminate at the similar height relative to the bottom 192. Alternatively, the passages 174 and 176 may not parallel or straight and may not terminate at the relatively same height.

Figure 3:
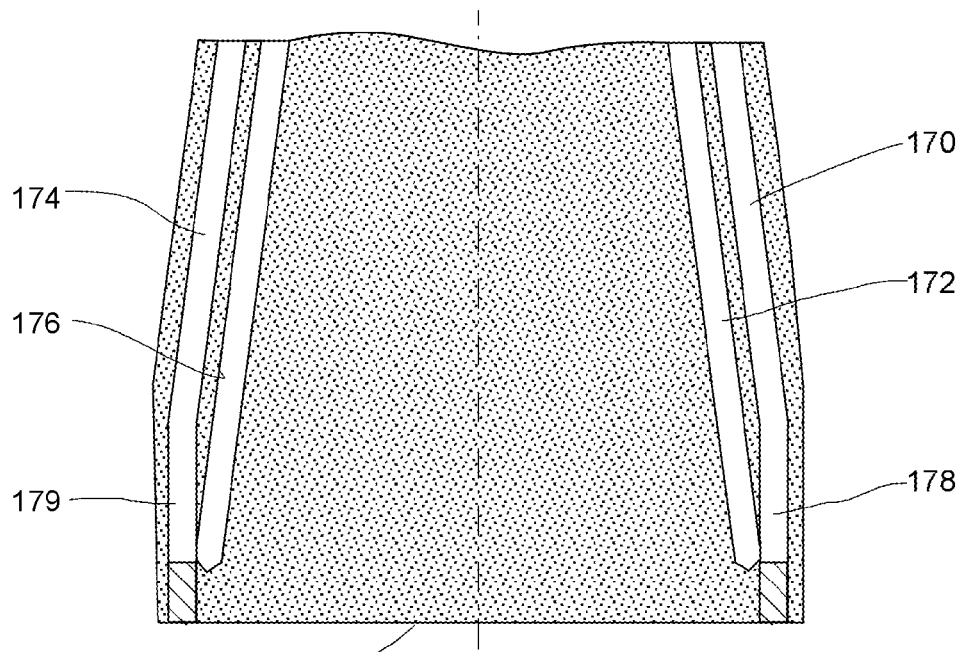
FIG. 3 is an enlarged view of passages of a reforming mandrel according to still another embodiment.

In yet another embodiment, as shown in FIG. 3, the passage 170 may have a vertical passage 178 relative to the bottom 192 at one end of the passage 170. The vertical passage 178 may be connected with the passage 172. Similarly, the passages 174 may have a vertical passage 179 relative to the bottom 192 at one end of the passage 174. The vertical passage 179 may be connected with the passage 176.

Figure 4:
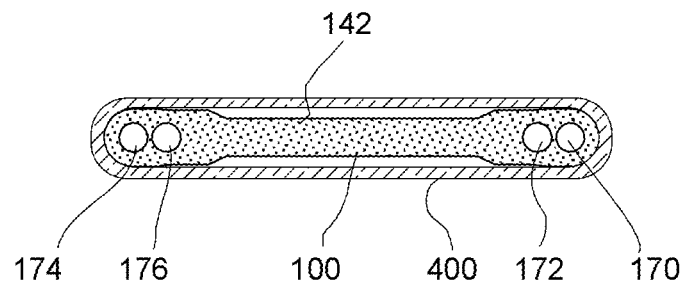
FIG. 4 is a cross-sectional view of a reforming mandrel in use according to an embodiment.

As shown in FIG. 4, the reforming mandrel 100 may be configured to shape tubing 400 from an initial cross-sectional profile to a final cross-sectional profile. The final cross-sectional profile may be different from the initial cross-sectional profile. The cross-sectional profile of the tubing 400 may be characterized by a shape and a size. Therefore, shaping of the tubing 400 may involve shape transformation and/or dimensional transformation. In one embodiment, the reforming mandrel 100 may be used to shape tubing 400 from an initial round cross-sectional shape to a final non-round cross-sectional shape. In a more specific embodiment, the final non-round cross-sectional shape may be an oblong shape (or an elongated shape), as shown in FIG. 4. In one embodiment, the oblong shape may have an aspect ratio greater than 5:1. In another embodiment, the oblong shape may have an aspect ratio greater than 10:1. The reforming mandrel 100 may have flattened peripheral portions 142 which separate two passages 170 and 172 at one side away from two passages 174 and 176. The flattened peripheral portions 142 may be recessed to prevent any contact or any scratches with a central area of the tubing 400. The configuration of the reforming mandrel 100 as shown in FIG. 4 may overcome edge bending force momentum which creates local surface distortions in the transition zone in between the edge and the central area. This edge bending force momentum is reduced by the passages 170 and 172 or 174 and 176 on each side. More specifically, the non-supporting non-touched flat central area in the tubing 400 may be compensated by pressurized air blown out of two passages on each side of the recessed flattened peripheral portion 142.

Figure 5:
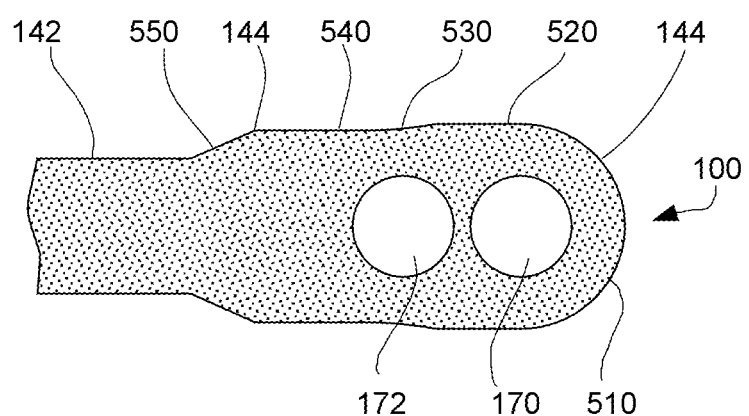
FIG. 5 is an enlarged cross-sectional view of passages as shown in FIG. 4.

As shown in FIG. 5, at least one curved peripheral portion 144 on the reforming mandrel 100 may include at least one passage as discussed before. The at least one passage may comprise the first passage 170 and the second passage 172. The first passage 170 may have a first corresponding exterior surface 520 and a round edge 510. The second passage 172 may have a second corresponding exterior surface 540. The first corresponding exterior surface 520 may be progressively reduced to the flattened cross-section 142 via the second corresponding exterior surface 540. There may be a slope 530 between the corresponding exterior surfaces 520 and 540. The reforming mandrel 100 may further include a step 550 between the flat second corresponding exterior surface 540 and the flattened peripheral portion 142. This optimized mandrel design may present the flat step of the first corresponding exterior surface 520, about 3 mm supporting area beyond the rounded edge 510 and two passages 170 and 172 with diameters of about 3 mm.

The previously filed application WO2014036236 teaches a glass tube reforming process based on the use of an internal mandrel. It offers good internal and external surface quality by the use of the combination of a profiled mandrel preventing any contact with the display area and a localized air bearing minimizing glass mandrel interaction on the edges. The transition zone in between the rounded edges and flat display area may be very critical in terms of geometry. Edge effects tend to reject local bending momentum in this area, creating a geometrical distortion usually known as a "dog bone" effect. The internal reforming operated with a graphite mandrel may need to compromise between total calibration preventing the dog bone effect and leaving scratches on the internal surface and geometrical control on a limited area with potential loss of control on untouched areas. The current specification brings a key improvement to the technique. The reforming mandrel 100 may desirably reduce the presence of dog-bone defects and reduce surface degradation on edges of glass tubing.

In another embodiment, a method for producing a glass sleeve with a flattened portion may be carried out by providing a substantially cylindrical glass tubing 400, the substantially cylindrical tubing 400 having a longitudinal axis 610 and an inner curved surface 620 enclosing a space 630; heating at least a portion of the substantially cylindrical tubing 400 to a temperature within the softening range of the glass; and moving the softened substantially cylindrical tubing 400 over a reforming mandrel 100 to reform the glass tubing 400 into a glass sleeve with a flattened portion. The method may further include a step of allowing gas to enter through the intake inlet into the at least partially hollow interior and permeating to an exterior of the reforming mandrel through the porous material and at least one passage. The reforming mandrel 100, which is described previously, may further include a nose 102 or a plug 640. Optionally in any embodiment, the reforming mandrel may comprise an upstream portion 120, the downstream portion 140, and an at least partially hollow interior. The upstream portion may have an intake inlet for fluid flow. The downstream portion may be axially spaced from the upstream portion. The downstream portion may have a flattened cross-section defined by flattened peripheral portions joined by curved peripheral portions. At least one curved peripheral portion may be made of porous material resistant to a temperature of at least 1000° C. An at least partially hollow interior may communicate with the intake inlet and the porous material.

The method may significantly improve glass surface quality, compatible with display applications and optical clarity by reducing or eliminating non-local deformations or local surface defects such as pits, scratches, and dimples, etc. By using such a method, the roughness may be less than 0.2 nm, for example. Optionally in any embodiment, the porous material is resistant to a temperature of at least 1200° C. Optionally in any embodiment, the porous material comprises carbon, zeolite or molecular sieves, for example. The carbon may comprise graphite. The graphite may be amorphous graphite, for example.

Optionally in any embodiment, the gas may be an inert gas, such as nitrogen or argon. Optionally in any embodiment, at least one curved peripheral portion may comprise at least one passage. Optionally in any embodiment, the at least one passage may communicate with the at least partially hollow interior.

Optionally in any embodiment, two flattened peripheral portions may be separated by a first width, for example. Optionally in any embodiment, the at least one curved peripheral portion may have a second width that is greater than the first width, for example.

Optionally in any embodiment, the gas may be at a gas pressure exceeding atmospheric pressure when it reaches the exterior of the reforming mandrel. Optionally in any embodiment, the gas pressure may be higher adjacent to each corner than it is away from each corner.

Figure 6:
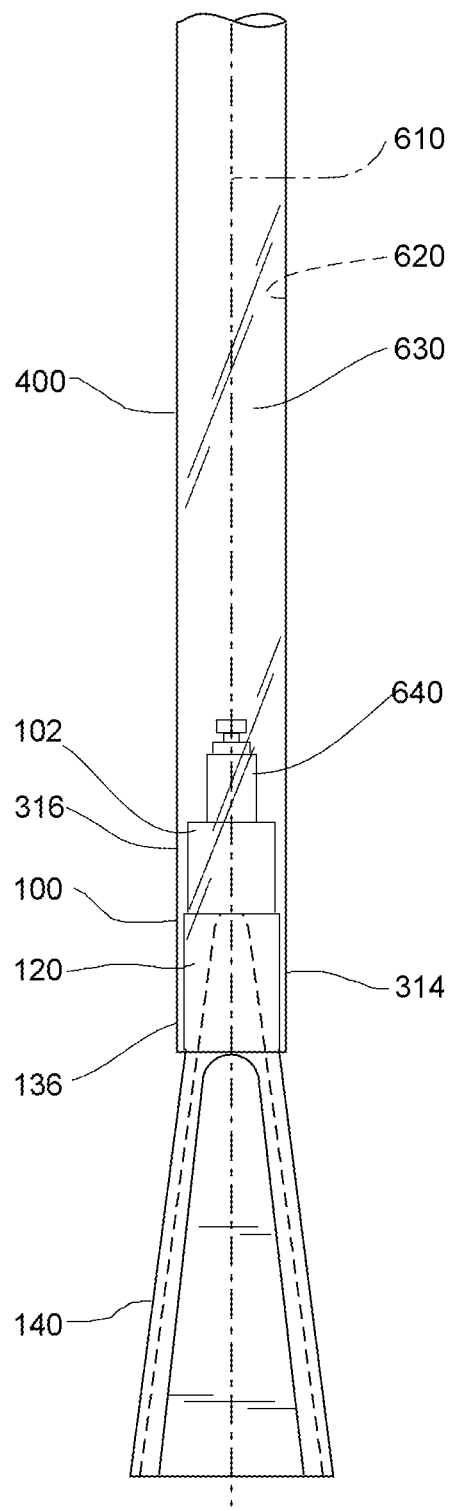
FIG. 6 illustrates a beginning process of reforming tubing using the reforming mandrel shown in FIG. 1.

FIG. 6 illustrates use of the reforming 100 to shape the glass tubing 400. The heating arrangement is not specifically shown in the figure. However, for the reshaping process to work, the glass tubing 400 should be at a temperature at which it can be deformed. In general, any suitable method and arrangement for heating the glass tubing 400 may be used. Heating may be radiant heating, induction heating, resistive heating, or any combination of the preceding. Other heating methods not specifically mentioned may also be used provided the heating method can elevate the temperature of the glass tubing 400 to a level at which the glass tubing 400 may be deformed when fluid pressure is applied by the conforming tool 100. The heating arrangement may also provide different temperature zones, e.g., a preheating zone, a reforming zone, and a cooling zone. For a glass material such as Corning Code 7740 borosilicate glass, for example, the preheating zone and cooling zone may be at 650° C. while the forming zone is at 780° C.

Relative to the orientation of the glass tubing 400 in FIG. 6, the process starts from the bottom end of the glass tubing 400. As the glass tubing 400 is pulled downwardly, the plug 640 and nose 102 of the reforming tool 100 first enter the glass tubing 400 through the bottom end of the glass tubing 400. Then, the upper stream portion 120 follows the nose 102 into the glass tubing 400. At this point, gas may be supplied into the intake inlet 122 and the at least partially hollow interior 160 and via a porous circumference 136 of the upper stream portion 120. Because of the sizing of the upper stream portion 120, a circumferential gap 314 is defined between the upper stream portion 120 and the glass tubing segment 316 in opposing relation to the upper stream portion 120. The discharged fluid from the upper stream portion 120 forms a film of pressurized gas in the circumferential gap 314. The film of pressurized gas in the circumferential gap 314 functions as a gas bearing between the surfaces of the upper stream portion 120 and the glass tubing 400. In one aspect, the estimated film thickness may be from about 40 microns to about 70 microns, for example. The gas bearing exerts pressure on the wall of a glass tubing segment 316. This pressure radially expands the glass tubing segment 316, allowing a small portion of the downstream portion 140 to enter into the glass tubing 400. As the glass tubing 400 is moved downwardly, the glass tubing 400 may be reformed by the reforming mandrel 100 into a glass sleeve with a flattened portion.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A reforming mandrel comprising:
an upstream portion having an intake inlet for fluid flow;
a downstream portion axially spaced from the upstream portion, the downstream portion having a flattened cross-section defined by flattened peripheral portions joined by curved peripheral portions, at least one curved peripheral portion made of porous material resistant to a temperature of at least 1000° C.; and
an at least partially hollow interior communicating with the intake inlet and the porous material;
wherein the at least one curved peripheral portion comprises at least one passage that extends alongside the at least partially hollow interior.

2. The reforming mandrel of claim 1, wherein the porous material comprises carbon.

3. The reforming mandrel of claim 2, wherein the porous material comprises graphite.

4. The reforming mandrel of claim 1, wherein the porous material is resistant to a temperature of at least 1200° C.

5. The reforming mandrel of claim 1, wherein the intake inlet is configured to allow gas to enter into the at least partially hollow interior and wherein the porous material is configured to allow gas to permeate to an exterior of the reforming mandrel.

6. The reforming mandrel of claim 1, wherein the at least one passage communicating with the at least partially hollow interior.

7. The reforming mandrel of claim 6, wherein the at least one passage comprises a first passage and a second passage, the first passage having a first corresponding exterior surface, the second passage having a second corresponding exterior surface, wherein the first corresponding exterior surface is progressively reduced to the flattened cross-section via a second corresponding exterior surface.

8. The reforming mandrel of claim 1, wherein two flattened peripheral portions are separated by a first width, and wherein the at least one curved peripheral portion has a second width that is greater than the first width.

9. The reforming mandrel of claim 8, comprising two curved peripheral portions separated by the flattened peripheral portions, wherein there is a corner between each flattened peripheral portion and each curved peripheral portion and further wherein at least one passage is provided adjacent to each corner.

10. The reforming mandrel of claim 9, wherein the intake inlet is configured to allow gas to enter into the at least partially hollow interior and wherein the porous material and at least one passage are each configured to allow gas to permeate to an exterior of the reforming mandrel.

11. The reforming mandrel of claim 10, wherein the gas is at a gas pressure when it reaches the exterior of the reforming mandrel and wherein the gas pressure is higher adjacent to each corner than it is away from each corner.

12. A method for producing a glass sleeve with a flattened portion comprising:

a. providing a substantially cylindrical glass tube made of glass, the substantially cylindrical tube having a longitudinal axis and an inner curved surface enclosing a space;
b. heating at least a portion of the substantially cylindrical tube to a temperature within the softening range of the glass;
c. moving the softened substantially cylindrical tube over a reforming mandrel to reform the glass tube into a glass sleeve with a flattened portion; wherein the reforming mandrel comprises an upstream portion having an intake inlet for fluid flow, a downstream portion axially spaced from the upstream portion, the downstream portion having a flattened cross-section defined by flattened peripheral portions joined by curved peripheral portions, at least one curved peripheral portion made of porous material resistant to a temperature of at least 1000° C., and an at least partially hollow interior communicating with the intake inlet and the porous material;
wherein the at least one curved peripheral portion comprises at least one passage that extends alongside the at least partially hollow interior.

13. The method of claim 12, wherein the porous material is resistant to a temperature of at least 1200° C.

14. The method of claim 12, further comprising allowing gas to enter through the intake inlet into the at least partially hollow interior and permeate to an exterior of the reforming mandrel through the porous material.

15. The method of claim 12, wherein the at least one passage communicating with the at least partially hollow interior.

16. The method of claim 15, wherein the at least one passage comprises a first passage and a second passage, the first passage having a first corresponding exterior surface, the second passage having a second corresponding exterior surface, wherein the first corresponding exterior surface is progressively reduced to the flattened cross-section via the second corresponding exterior surface.

17. The method of claim 12, wherein two flattened peripheral portions are separated by a first width, and wherein the at least one curved peripheral portion has a second width that is greater than the first width.

18. The method of claim 17, wherein the reforming mandrel further comprises two curved peripheral portions separated by the flattened peripheral portions, wherein there is a corner between each flattened peripheral portion and each curved peripheral portion and further wherein at least one passage is provided adjacent to each corner.

19. The method of claim 18, further comprising allowing gas to enter through the intake inlet into the at least partially hollow interior and permeating to an exterior of the reforming mandrel through the porous material and at least one passage.

20. The method of claim 19, wherein the gas is at a gas pressure when it reaches the exterior of the reforming mandrel and wherein the gas pressure is higher adjacent to each corner than it is away from each corner.

* * * * *